United States Patent [19]

Girgis

[11] 4,393,189
[45] * Jul. 12, 1983

[54] METHOD OF PREPARING A PHENOLIC ALDEHYDE RESIN AND RESIN COMPOSITION FOR AN ADHESIVE SYSTEM TO BE APPLIED TO GLASS FIBERS

[75] Inventor: Mikhail M. Girgis, Pittsburgh, Pa.

[73] Assignee: PPG Industries, Inc., Pittsburgh, Pa.

[ * ] Notice: The portion of the term of this patent subsequent to Feb. 2, 1999, has been disclaimed.

[21] Appl. No.: 321,971

[22] Filed: Nov. 16, 1981

Related U.S. Application Data

[63] Continuation of Ser. No. 163,355, Jun. 26, 1980, abandoned, which is a continuation-in-part of Ser. No. 956,473, Oct. 30, 1978, Pat. No. 4,314,050.

[51] Int. Cl.³ ............................................. C08G 8/22
[52] U.S. Cl. ............................. 528/155; 156/110 A; 156/110 C; 156/110 MD; 524/596; 528/137; 528/140; 528/147
[58] Field of Search ............... 528/137, 140, 147, 155

[56] References Cited

U.S. PATENT DOCUMENTS

| | | | |
|---|---|---|---|
| 1,598,546 | 8/1926 | Baekeland et al. | 525/503 |
| 2,128,229 | 8/1938 | Charch et al. | 154/40 |
| 2,211,951 | 8/1940 | Hershberger | 154/40 |
| 2,385,372 | 9/1945 | Rhodes | 260/54 |
| 2,385,374 | 9/1945 | Rhodes | 260/30 |
| 2,398,388 | 4/1946 | Norton | 154/140 |
| 2,414,415 | 1/1947 | Rhodes | 154/140 |
| 2,429,397 | 10/1947 | Compton et al. | 154/92 |
| 2,443,197 | 6/1948 | Rhodes | 154/133 |
| 2,478,943 | 8/1949 | Rhodes | 260/54 |
| 2,488,495 | 11/1949 | Malashevitz | 528/155 X |
| 2,593,926 | 4/1952 | Simons | 528/147 X |
| 2,652,353 | 9/1953 | Wilson | 154/136 |
| 2,653,891 | 9/1953 | Gentle et al. | 154/136 |
| 2,885,386 | 5/1959 | Straka et al. | 528/147 X |
| 3,116,164 | 12/1963 | Miller et al. | 117/140 |
| 3,133,034 | 5/1964 | St. Clair et al. | 260/29.3 |
| 3,242,118 | 3/1966 | St. Clair et al. | 260/29.3 |
| 3,308,096 | 3/1967 | Ivanov et al. | 260/54 |
| 3,358,051 | 12/1967 | Timmins et al. | 528/137 X |
| 3,424,608 | 1/1969 | Marzocchi et al. | 117/72 |
| 3,437,610 | 4/1969 | Moult | 260/10 |
| 3,597,379 | 8/1971 | Van Valkenburg | 260/29.3 |
| 3,634,276 | 1/1972 | Kreibich et al. | 252/182 |
| 3,814,713 | 6/1974 | Honda et al. | 260/29.3 |
| 3,817,890 | 6/1974 | Rouzier | 260/29.3 |
| 3,876,620 | 4/1975 | Moss | 528/147 X |
| 3,919,151 | 11/1975 | Moult et al. | 260/29.3 |
| 3,956,205 | 5/1976 | Higginbottom | 260/1 |
| 4,007,233 | 2/1977 | Kako et al. | 260/845 |
| 4,010,163 | 3/1977 | Hesse et al. | 260/29.3 |
| 4,025,454 | 5/1977 | Rouzier | 252/182 |
| 4,314,050 | 2/1982 | Girgis | 528/140 |

*Primary Examiner*—Howard E. Schain
*Attorney, Agent, or Firm*—Kenneth J. Stachel

[57] ABSTRACT

A method of preparing a thermoplastic, water-soluble, phenolic aldehyde resin and the composition are provided to enhance the flexibility and resistance to compression fatigue breakage of glass fibers to which the resin has been applied. The method involves two steps. In the first step, the phenolic compound and the aldehyde are reacted to less than 100 percent completion in an amount so that the aldehyde to phenolic compound ratio is in the range of about 0.6 to about 1.5 and at an acidic pH and for a period of time equivalent to about 3 hours to about 10 hours when the temperature is in the range of about 55° F. (13° C.) to about 90° F. (32° C.) to produce a resinous mixture. In the second stage the pH of the reaction is adjusted within the range above about 7.0 to about 7.5 and the reaction is continued between the unreacted phenolic compound and aldehyde and resinous mixture to produce a resinous mixture composition that is thermoplastic, and water soluble and has trimer polymer with slight cross-linking and dimer and no higher oligomer polymers.

The phenolic aldehyde resin mixture is processed into an adhesive system by combining it with one or more elastomeric latex and various latex additives. The adhesive system is aged and has added to it an amine or ammonia to tie up any unreacted aldehyde. Also additional phenolic compound may be added. The adhesive system is used to coat filamentary materials and the coated filamentary materials are dried to produce reinforcement material for rubber.

6 Claims, No Drawings

METHOD OF PREPARING A PHENOLIC ALDEHYDE RESIN AND RESIN COMPOSITION FOR AN ADHESIVE SYSTEM TO BE APPLIED TO GLASS FIBERS

RELATED APPLICATIONS

This is a continuation of application Ser. No. 163,355, filed June 26, 1980, now abandoned, which was a continuation-in-part application of patent application Ser. No. 956,473, filed Oct. 30, 1978, now U.S. Pat. No. 4,314,050, issued Feb. 2, 1982.

BACKGROUND OF THE INVENTION

This invention is related to a method for preparing phenolic aldehyde resin. More particularly, this invention relates to a method for preparing resorcinol-formaldehyde resin for use in an adhesive system for the adhesion of glass fiber to rubber to produce reinforced rubber goods.

Filamentary materials have been used extensively as reinforcing material in rubber to produce reinforced rubber products, such as pneumatic tires, power-drive belts, conveyor belts, high pressure hoses and the like. The filamentary materials that are used to reinforce rubber material include naturally occurring or synthetic filaments and may be in the form of individual fibers, groups of fibers in the form of strand, rope, cord, roving fabric and the like. The naturally occurring fibers include cotton, silk, ramie and the synthetic fibers include rayon, nylon, polyester and glass fibers.

Glass fibers are excellent filamentary material for reinforced rubber and are superior to the natural and synthetic organic filamentary materials, since the glass fibers do not become elongated or deformed under stress to the extent of the other filamentary materials. Unlike other filamentary materials, particular combinations of glass fibers with encapsulating coating cooperate to yield reinforced rubber materials that have greater strength than even the glass or the coating material alone. While filamentary materials, other than glass fibers, which are subject to substantial stress elongation, are essentially limited in tensile strength to the basic strength of their fibers, even if coated properly, coated glass fibers have greater strength than the glass alone. For example, the low modulus of elasticity of glass may be exploited to provide reinforced rubber tires having superior road performance, if an appropriate coating medium is provided to transfer stresses to all fibers in the glass fiber cord so that loading throughout is substantially uniform. This phenomenon is illustrated by the observation that a typical uncoated fiber glass cord (G75,5/0, filament count 2,000 i.e., 2,000 filaments of G fiber of about 9.14 micro meter diameter, 15,120 meters per kilogram, 5 strands per cord) has a tensile strength of about 35 to 40 pounds (156 to 178 newtons) ASTM test G178-52, but when coated with a coating, e.g., resorcinol formaldehyde latex coating, such a cord has a tensile strength of about 50 to about 70 pounds (220 to 311 newtons).

The above-mentioned coated glass fiber cord, GT-75,5/0 has found particular utility in the reinforcement of rubber for use in power transmission belts and fiber glass reinforced tires and the like. In such a coated glass fiber cord, a resorcinol formaldehyde latex coating is used as the adhesive system to transfer the stresses and to provide adhesion between the glass fibers and the rubber. Typically, the resorcinol formaldehyde, or resorcinol-phenol-aldehyde resin, useful in adhesive systems for the adhesion of glass fibers to rubber is produced by a method using a basic pH environment, i.e., around a pH of 8 to 10. The phenolic aldehyde resin usually has an aldehyde level to phenolic compound level, usually resorcinol, of 0.4 to 0.8 to one phenolic compound on a mole basis. Such a resin is characterized by a low degree of polymerization and minimum molecular weight. A particularly useful phenol aldehyde condensate, which is a resorcinol formaldehyde resin, has a ratio of 0.6 formaldehyde to 1 resorcinol, and is sold under the designation Penacolite ® R-2200 resin.

There are several methods known in the art for preparing phenol aldehyde polymers to be used in adhesive systems. As early as 1947 in U.S. Pat. No. 2,385,372 (Rhodes) a permanently fusible resin was prepared from dihydoxybenzene (resorcinol) and an aldehyde in two stages to that a catalyst was not present during the stages of a reaction. It was theorized that having the catalyst present in the early stages of the reaction would cause a resin to be too thick for the removal of the water produced by the reaction. The problem was overcome by employing a two-stage reaction, wherein the dihydroxybenzene (resorcinol) is reacted at reflux conditions with the aldehyde without a catalyst until a major portion of the reaction is completed. Then either an alkaline or acid catalyst is added and the last increment of aldehyde reacts with the dihydroxybenzene.

Also a several stage reaction has been employed to produce a phenolic aldehyde condensate in U.S. Pat. No. 4,025,454 (Rouzier), wherein a pre-condensate of formaldehyde, resorcinol and a para-substituted phenol and a pre-condensate of resorcinol and formaldehyde are used. In a first stage, resorcinol and a para-substituted phenol with two active methylene groups are condensed in the presence of an acid catalyst. In the second stage formaldehyde is condensed with the product of the first stage in an alkaline medium. Then in the third stage the product of the second stage is dissolved in water along with a resorcinol pre-condensate to form the phenoplastic system, which is a mixture of phenol aldehyde condensates, then combined with an elastomeric latex to form the adhesive for textile fibers.

Also, in U.S. Pat. No. 3,956,205 (Higginbottom) a resole is produced by a two-stage reaction. The first stage of the reaction is carried out under novolac forming conditions, where an acid catalyst is used to give a pK that is less than 5. In the first stage, one mole of phenol is reacted with 0.05 to 0.30 moles of formaldehyde in order to favor the formation of the dimer polymer and suppress the formation of higher oligomers. In the second stage the reaction is conducted in the presence of a basic catalyst, which has a pK greater than 9 with the addition of 1.75 to 3.5 moles of formaldehyde per mole of original phenol for the resole reaction. At the end of the reaction, the catalyst is neutralized by addition of acid to reduce the pH to between 6 and 8.5 to produce the resole resin.

The phenolic aldehyde resins of the prior art, such as Penacolite ® resorcinol formaldehyde resin, and those produced by the aforementioned multi-stage processes can be improved upon for use in an adhesive system to coat glass fibers that are used to reinforce rubber products. An improvement of the phenolic aldehyde resin is desired to give the coated glass fibers more flexibility and better resistance to compression fatigue breakage, thereby yielding more durable and longer lasting reinforced rubber products.

One of the many reinforced rubber products that would benefit from the use of coated glass fibers having more flexibility and better resistance to compression fatigue are pneumatic tires. A bias belted tire having coated glass fibers that have more flexibility and better resistance to compression fatigue would have improved wear characteristics and would give extended mileage. Also radial tires having glass fiber belts, alone or in combination with other filamentary material belts, containing coated glass fibers having more flexibility and better resistance to compression fatigue would give extended mileage and improved handling.

It is an object of the present invention to provide a method for preparing a thermoplastic, phenolic formaldehyde resin having improved flexibility and having toughness and which is comprised of a substantial amount of the trimer polymer and to provide the said resin composition for use in an adhesive system used in coating glass fibers to render the glass fibers more flexible and more resistant to compression fatigue breakage.

SUMMARY OF THE INVENTION

According to the present invention a thermoplastic, phenolic aldehyde resin, which has a substantial amount of trimer polymer, and which has a small amount of unreacted aldehyde is prepared. The method involves a two-step reaction. In the first step a phenolic compound and the aldehyde are reacted in amounts so that the ratio of aldehyde to phenolic compound is in the range of about 0.8 to about 1.5 and to less than 100 percent completion in an acid medium at ambient conditions generally for a period of time equivalent to about 3 hours to about 10 hours at a temperature in the range of about 11° C. (55° F.) to about 32° C. (90° F.) to produce a phenolic aldehyde resinous mixture. In the second step the pH of the resinous mixture from the first stage is adjusted within the range of above 7 to about 7.5 to continue the condensation reaction of the phenolic compound and aldehyde and resinous mixture to produce the more flexible and tough, thermoplastic, water soluble, phenolic aldehyde resin containing the trimer and dimer polymers, and having a small amount of unreacted aldehyde, but no oligomers higher than trimer.

The resinous mixture produced is a thermoplastic, water soluble, phenolic aldehyde resin that is idealy suited for use in an adhesive system, like RFL systems, to coat glass fibers to give the coated glass fibers better adhesion to rubber stock to produce reinforced rubber products.

Generally the phenolic compound and aldehyde undergoing reaction and any acid or basic catalyst, if any, used to control the pH in the respective steps of the process of the invention can be any phenolic compound, aldehyde, acid or basic catalyst known to those skilled in the art of phenolic aldehyde resiins. The term "resin" refers to synthetic resins that are organic substances synthesized from relatively simple chemical compounds by condensation polymerization reactions.

The phenolic aldehyde resin produced by the carefully controlled two step process of the present invention gives phenolic aldehyde resins that are flexible and tough and that when used in an adhesive system for coating glass fibers render the coated glass fibers more flexible and more resistant to compression fatigue. Because of the pH control in both steps of a two step process, and because the reactants added to the first step are not completely reacted in the first step, and because of the relation of the temperature and time conditions in both steps, the trimer polymer is formed by the two step reaction. Other polymer forms such as the dimer are also produced. The trimer polymer form can be represented by the following formula:

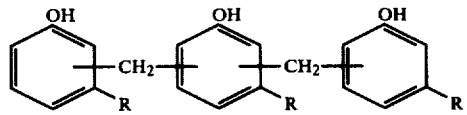

FORMULA 1 where R is hydrogen or a hydroxyl group or mixture thereof, the timer may also have one or more pendant methyol groups from the phenolic rings in the timer. The pH control in the second stage allows for a slight degree of cross-linking in the reaction product from the first stage reaction.

The phenolic aldehyde resin prepared according to the above described process is actually a mixture of polymer forms with the trimer polymer chain and where there is a small amount of cross-linking. This phenolic aldehyde resin is an excellent resin for use in an adhesive system for bonding glass fibers to rubber stock. The resin is first combined with a conventional elastomeric latex so that the resin is present in an amount of about 5 to about 50 parts by weight of the resin per 100 parts by weight of elastomeric latex solids. Other components such as wax, antioxidants and bond enhancers, one example of which is resorcinol, and cross-linking retarding agents, for example concentrated ammonia can be added to the adhesive system. Sufficient water is present or added to adjust the total solids content of the adhesive system from about 20 to about 40 percent solids. This adhesive system is used to coat glass fiber materials such as individual glass fibers and groups of glass fibers in the form of strand, rope, cord, roving, fabric and the like.

DETAILED DESCRIPTION

The phenolic aldehyde resin of the present invention has, as mentioned above, trimer polymers in the mixture of polymers that constitute the phenolic aldehyde resin, and is prepared by a carefully controlled, multi-step process. In the first step the reactants are reacted to less than 100 percent completion in an acid pH of around 3.5 to 5.5 and in the second step the resinous reaction is continued at a pH in the range of about 7 to about 7.5.

It is believed, but the invention is not limited by this belief, that the process and the amounts of starting material result in the composition in the following manner. The phenolic compound has a strong ortho-para-directing influence because of the hydroxyl group, and resorcinol, the predominant phenolic compound, is doubly activated in the 2, 4 and 6 position on the ring. When the aldehyde to phenolic compound ratio is around one, a resin is obtained in an acid medium that is permanently fusible and soluble. Very little, if any, cross-linking occurs, and the resin consists predominantly of chains in which the phenol nuclei are connected by means of methylene bridges to the activated positions of the phenolic nuclei. In the acid medium the 2 and 6 positions of the phenolic nuclei are favored for the condensation reaction. The rate of reaction for the formation of the resin is directly proportional to the hydrogen-ion concentration. By controlling the acidic pH in the first step to be acidic, and by controlling the temperature and residence time within the specified ranges, the resin reaction is less than 100 percent complete. The result is that along with the resin produced in the first step there is also present some unreacted aldehyde and possibly some unreacted phenolic compound. Since the resin formation reaction of the first step is less than 100 percent complete, even though the ratio of aldehyde to phenolic compound may be more than 1, even up to about 1.5, the resin produced is still permanently fusible and soluble. The mean molecular weight of the resin from the first step of the reaction is generally less than 1,000.

The reaction mixture from the first step has its pH adjusted to a range of above 7 to about 7.5. Although the rate of resin formation in the presence of basic catalysts is independent of the hydroxyl ion concentration above low concentrations of the catalyst, the small amount of basic catalyst added to bring the pH to above 7 to 7.5 is low enough so that the hydroxyl ion concentration has an effect on the rate of reaction. The resinous material from the first step continues to react with the unreacted aldehyde and any unreacted phenolic compound present from the first step to form methylol groups which condense further upon aging of the resinous material in the second step to produce a slightly cross-linked but still essentially linear, thermoplastic, phenolic resin having trimer polymers in the mixture of polymers that compose the phenolic aldehyde resin. The resinous mixture also contains dimer polymer and no higher oligomer polymers such as tetramers and pentamers. It is desirable to keep the amount of higher oligomers to a minimum, since these higher oligomers are not water soluble. The resin mixture with the substantial amount of trimer and dimer polymer has good flexibility which is transferable to a substrate coated with the phenolic aldehyde resin of the present invention.

Since a basic pH is used only in the second step, the formation of the phenolic alcohols in the second step is mostly limited to methylol rather than dialcohols or trialcohols, and this limiting effect assists in the growth of the essentially linear, thermoplastic resin from the first step. The limitation of the methylol phenolic alcohols along with the directing influence of a basic environment to reaction at the 2, 4 and 6 positions, leads to the growth of cross-links in the essentially linear chains in the resinous mixture of the first step. The addition of the methylol groups to provide a slight amount of cross-linking in the linear chain of the resinous material from the first step gives the resinous material a degree of toughness, while still maintaining the flexibility of the linear chain. The reaction in the second step is continued for about 2 to about 10 hours to obtain the resin having good flexibility with a small amount of cross-linking to give the resin a degree of toughness. The cross-linking and/or branching is not to such an extent that the resin becomes cross-linked and infusible.

In the process and composition of the present invention, the structure of the phenolic compound is an important factor in the characteristics of flexibility and toughness of the resin and the resin coated substrates. The rate of resinification depends on the nature and extent of the substitution of the phenolic compound. With the phenolic compound reacting with the aldehyde in the ortho- and para-positions to one or more hydroxyl groups on the ring, there should be at least two open positions either ortho or para to a hydroxyl group. The phenolic compounds useful in the process and composition of the present invention include resorcinol as well as resorcinol admixture with small amounts of phenol, cresol and mixtures of its isomers, xylenol or mixtures of its isomers, a mixture of homologues of phenol and dihydric phenols, such as phloroglucinol, orcinol, cresorcinol and m-xylorcinol. It is preferred to use resorcinol as the phenolic compound and in the alternative a mixture of resorcinol and phenol.

The aldehyde that is useful in the process and composition of the present invention is one that acts as a methylene donor and is soluble in the reaction medium. Aldehydes that can be used include: formaldehyde, commonly used as 37 percent aqueous solution referred to as formalin, various polymers of formaldehyde, such as paraformaldehyde, hexamethylene-tetramine, acetaldehyde and furfural, and mixtures thereof. It is preferred to use formaldehyde in the form of formalin.

Hereinafter in the specification, the phenolic compound will be referred to as "resorcinol", the preferred phenolic compound, and the aldehyde will be referred to as "formaldehyde", the preferred aldehyde. But it is to be understood that any of the aforementioned phenolic compounds or aldehydes can be used, as described, in lieu of or in combination with the resorcinol and formaldehyde.

The amounts of resorcinol and formaldehyde that are used are those that give a mole ratio of formaldehyde to resorcinol in the range of about 0.8 to about 1.5.

If too little an amount of resorcinol or too much formaldehyde are used in infusible, cross-linked resin will be produced instead of a fusible, thermoplastic resin with very little cross-linking that is flexible and tough. If too much resorcinol and too little an amount of formaldehyde are used the resin produced will not be as flexible as possible because the number of trimer polymers in the polymer mixture will not be very large.

In the first step of the present invention the type of acid catalyst that can be used include: sulfuric acid, oxalic acid, hydrochloric acid, sulfamic acid, benzene sulfonic acid, toluene sulfonic acid or trifluoracetic acid. The concentration of acid catalyst can be in the range of around 0.001 to 0.002 mole equivalents per mole of resorcinol but the acid pH of the first step reaction can be any acid pH with sufficient amount of catalyst added to achieve the desired pH. Preferably the pH of the first step reaction is that acid pH achieved by combining the resorcinol and formaldehyde in the form of formalin for the reaction. Most preferably, this pH that is achieved by combining the reactants produces autocatalysis in the pH range of about 3.5 to 5.5. An acid pH above 5.5 which is achieved by autocatalysis can be used by adding a small amount of basic catalyst. If the pH is above about 5.5, then resorcinolic alcohols like methylol may be produced and cross-linking may occur.

The reaction in the first step is conducted by adding the resorcinol and formaldehyde to a reaction vessel. Preferably, resorcinol and formaldehyde, as formalin, are added to a reaction vessel in the proper amounts to give the desired mole ratio. If a monohydric phenol, like phenol, is present to any degree, the reaction conditions must be elevated since monohydric phenols react more slowly than resorcinol or polyhydric phenols. Generally, in the first step the resin reaction is conducted at ambient conditions of temperature for the resin reactin between resorcinol and formaldehyde in the range of about 55° F. (13° C.) to about 90° F. (32° C.) when the residence time for the resin reaction in first step is in the range of about 3 hours to about 10 hours, where the temperature and time are inversely related. An equivalent residence time and temperature can be used to give the same reaction rate as achieved by using the foregoing conditions, i.e., as the temperature is increased, the residence time is shortened. If the temperature is increased above 90° F. (32° C.) the residence time is shortened to less than 3 hours, and if the temperature is decreased below 55° F. (11° C.) then the residence time must be increased beyond 10 hours.

At the end of the reaction in the first step a resinous or polymeric mixture is produced.

The resinous mixture of the first step is subjected to a second step by adjusting the pH of the resinous mixture to be in a range of above 7 to about 7.5. This adjustment is made by adding a basic catalyst to the resinous mixture. Suitable basic catalysts include; sodium hydroxide, potassium hydroxide, and other alkali metal hydroxies as well as alkali metal carbonates, and alkaline earth hydroxides. These can be used as solids but are preferably used in an aqueous solution. The concentration of basic catalyst is generally around 3 percent per mole of resin and preferably about 0.01 to about 0.06 mole of catalyst per mole of resin.

After the pH of the resinous mixture has been adjusted to the proper pH, the resin reaction is continued so the unreacted formaldehyde reacts with the resin and unreacted resorcinol. The reaction is conducted at ambient conditions generally being a temperature in the range of about 55° F. (13° C.) to about 90° F. (32° C.) when the residence time is in the range of about 2 hours to about 10 hours. If the temperature is increased or decreased above or below this range, the residence time is inversely adjusted and therefore, any temperatures and residence time can be used that allows for an equivalent reaction rate to that of the foregoing conditions of temperature and time.

If the pH is above about 7.5 then too many methylol groups will form and the resin may become cross-linked to too great an amount. If the pH is below about 7.0 then the acid type resin reaction of the first step will continue to occur and the linear timer polymer chain and other polymer forms will not obtain the small about of cross-linking to give a tough flexible resin.

The above described two-step process may be conducted in a batch-type reaction in one vessel or in a semi-continuous-type or continuous type reaction in one vessel with several stages or in several vessels where the reactants and products are cascaded from one vessel to the next. The reaction vessels used in the two-step process are any reaction vessels known to those skilled in the art to be useful for resin forming reactions. Preferably the reaction vessels or containers are those that are used at ambient conditions, but that are jacketed to allow for heating and cooling when ambient temperatures are too low during the winter or too high during the summer in industrial production facilities.

The resorcinol formaldehyde condensate resin mixture of the invention is combined directly with an aqueous elastomeric latex to form an adhesive system for binding fibrous materials to rubber. The elastomeric latices useful in the adhesive system are the conventional latices used in the formation of elastomer adhesive systems. Suitable elastomeric latices are the synthetic rubber latices such as vinylpyridine-styrene-butadiene terpolymer latices sold commercially under the trademark GEN-TAC, GOODRITE, or PYRA-TEX. Also polybutadiene dispersions, styrene-butadiene latices, reclaimed rubber dispersions, butyl rubber dispersions, and ethylenepropylene-butadiene terpolymer rubber dispersions can be used. Also other latices that can be used include natural rubber latex which may be the crude rubber latex or rubber latex that contains added material or that has been treated to alter the character of the rubber, for instance by degradation or by oxidation, or both. For instance, it may contain any desired accelerators, vulcanizers, stabilizers, dispersing agents or any other substance, such as, those commonly used in the rubber industry. When the rubber that is used is an artificial dispersion of any known synthetic rubber it may likewise contain additional substances such as rubber accelerators, vulcanizers, stabilizers, dispersing agents and the like. The type or kind of rubber dispersion or elastomeric latex to be used depends to some extent upon the type or kind of rubber stock to which it is desired to bond the fiberous material, particularly the glass fibers. Besides the specified elastomeric latices and dispersions any combination of the above is hereby disclosed for the purposes of this invention.

Generally, the adhesive system can be made in any manner known to those skilled in the art. The resin to elastomeric latex ratio of the adhesive system should range between about 5 to about 50 parts by weight of the resin per 100 parts by weight of elastomeric latex solids. The resorcinol formaldehyde resin-elastomeric latex mixture may also contain such additives as a wax to protect the elastomer in the coating composition from attack by ultraviolet light; zinc oxide, magnesium oxide, litharge, or red lead can be incorporated into the adhesive system to promote cross-linking or curing of the elastomeric latex and improve resistance of the composition to aging, heat and light; anti-oxidants to protect the materials from degradation due to oxygen; treated diatomaceous earths or chemical diatomaceous earths and other ingredients known to those skilled in the art may be added to the adhesive system to impart varying characteristics thereto.

The aqueous adhesive system of the present invention should have a pH of between above 7 to about 10. Any pH adjustment may be made by the addition of an aqueous caustic solution, such as, sodium hydroxide or the ammonium hydroxide to arrive at the desired pH. Also caustic solution like sodium hydroxide or ammonium hydroxide can be added to tie up any unreacted formaldehyde, if any, and thereby raise the pH of the adhesive system. However, if the composition added thereto is a vinyl pyridine latex (PH 10.2), the dip may not require futher pH adjustment. The adhesive system thus prepared is ready for immediate use, or because of its stability may be held for as long as a one week period before being used to coat filamentary materials, particularly glass fibers. The adhesive system may be applied to the surface of fiberous materials particularly glass fibers by any conventional method such as dipping, spraying or spreading.

The filamentary material to which the adhesive system of the present invention can be applied includes reinforcing materials, such as, natural and synthetic organic fibers like cellulousic fibers, nylon fibers, polyester fibers and glass fibers. Particularly, the filamentary material are glass fibers. Generally in the method of forming glass fiber cord in accordance with the present invention the glass fibers are formed at a fiber-forming bushing, sized with an aqueous sizing composition, which is a conventional glass fiber sizing composition, gathered into strand and wound on a forming package. This process is more fully described in U.S. Pat. Nos. 3,437,517; 3,459,585; and 3,887,389, hereby incorporated by reference. The forming packages are then dried and mounted on a creel, unwound and coated with the adhesive system coating composition of the present invention, and the coated strands are dried.

PREFERRED EMBODIMENT

In the preferred embodiment of the present invention, resorcinol and formaldehyde in the form of formalin are reacted in the two-step reaction to less than 100 percent completion, first by starting with a mole ratio for formaldehyde to resorcinol in the range of about 0.8 to about 1.5 and second by controlling the reaction conditions.

The reaction conditions of the first step with the mixture of formaldehyde and resorcinol at the preferred mole ratio include a pH in the range of 3.5 to about 5.5. Therefore, in the first step of the preferred embodiment an acid catalyst is not needed to obtain a pH in the range of 3.5 to 5.5 in the reaction between resorcinol and formaldehyde which is in the form of formalin. In an alternative embodiment with different reactants, if the pH of the first step reaction is not in the range of less than 5.5 and greater than 3.5 from the presence of the reactants alone, then an acid catalyst must be used. The reaction in the first step between resorcinol and formaldehyde is conducted at ambient conditions of temperature preferably around 20° C. to around 32° C. for a period of time around 3 to around 10 hours, preferably around 3 to around 4 hours.

The reaction conditions are adjusted in the second step. The pH of this resin mixture is adjusted to be in the range of above 7 to about 7.5 by adding about 0.01 to about 0.06 moles of an aqueous solution of potassium hydroxide per mole of resin, then the reaction of the resorcinol formaldehyde resin, unreacted resorcinol and unreacted formaldehyde is continued in the second step at pH of above about 7 to about 7.5 at a temperature preferably in the range of around 20° C. to around 32° C. and for a period of time in the range of around 2.5 hours to around 10 hours, preferably around 5 hours. The resinous product issued from the second step is flexible but tough resorcinol formaldehyde condensate resin mixture which is thermoplastic and being a mixture of polymer forms with trimer polymer that contains a small amount of cross-linking and that also contains less than 20 percent unreacted formaldehyde because of the incomplete reaction. The unreacted formaldehyde is available for reaction with the resorcinol formaldehyde condensate mixture when it is combined with an elastomeric latex to form an adhesive system.

In the preferred embodiment, the preferred resorcinol formaldehyde resin produced by the aforementioned process is combined with a polybutadiene Latex such as LPM 6290 available from Goodyear, and a vinyl pyridine styrene butadiene terpolymer latex available from Goodyear under the trade designation "LVP 5622". The amounts of the two latexes used are in the range of about 70 to about 90 parts per hundred parts rubber, most preferably 70 parts of the 6290 and an amount in the range of about 10 to about 30 parts per hundred parts rubber most preferably 30 parts of the "5622" terpolymer. The ratio of resorcinol formaldehyde condensate resin mixture to rubber latex should range between about 5 to about 50 parts resin per 100 parts rubber latex solid, that is, the amount of rubber on a dry basis of the latex. The rubber includes those aforementioned rubbers, such as, polybutadiene, SBR, vinyl pyridine and the like. Less than about 5 parts of resin will provide insufficient adhesion, whereas, greater than about 50 parts of resin for 100 parts latex is economically undesirable. Also to the resin latex adhesive system, there is added an antioxidant of the phenolic type such as Bostex 294 available from Akron Dispersion of Akron, Ohio. The amount of the antioxidant which is added, is usually in the range of around 1 part per 100 parts of dry rubber to enhance the coating flexibility over a wide range of temperatures. Also added is an aliphatic wax, such as Mobilcer Q wax available from Mobil Company, which is added in an amount in the range of around 5 parts per 100 parts of rubber. Also another antioxidant like Paracure A09 antioxidant is added in an amount of around 0.5 parts per 100 parts of rubber. After the adhesive system coating composition is prepared, it is allowed to age at ambient temperatures for at least around 10 hours. This ageing allows the unreacted formaldehyde of the resorcinol formaldehyde condensate resin mixture to react further with the condensate resin while it is in the presence of the elastomeric latexes. This produces a long-chained, slightly cross-linked, thermoplastic condensate resin that is associated with the latexes. After the ageing period a small amount of a nitrogenous base such as ammonia or low to medium boiling amine compounds, i.e., diethanolamine but preferably a small amount of concentrated ammonia (28% solution) is added to tie up any unreacted formaldehyde so that no further resin cross-linking occurs. The amount added is usually less than 1 part per 100 parts rubber. The ammonia addition stabilizes the adhesion system coating composition and prolongs its shelf life.

In addition, it has also been found that the bonding characteristics of the adhesive system can be improved by adding around 1 part per 100 parts of rubber of resorcinol after the addition of the ammonia solution. The added resorcinol increases the adhesion level of the adhesive system by increasing the resin content and increases the polarity of the adhesive system coating composition for better wettability and impregnation.

In general, the method of producing glass fiber bundles coated with the adhesive coating composition of the present invention is to contact a continuous bundle, for example, strand which has been previously sized, with the coating composition of the invention, and dry the coating within the bundle, and then cure the coating residing within and about the bundle to produce a coated cord suitable for rubber reinforcement. The contacting can be performed by rollers or through a bath and dye apparatus. A particularly advantageous method for producing the glass fiber bundles of the invention based upon the method described in U.S. Pat. No. 3,619,252 "Manufacture of Elastomeric Coated Glass Fibers" by Alfred M. Roscher, which is hereby incorporated by reference. This invention is particularly applicable to glass fiber, filament bundles, having complete filament encapsulation and having a relatively high ratio of coating weight, i.e., about 15–40 percent to glass weight.

Preferably the glass fiber strands are coated in the following manner. A plurality of glass fiber strand, which have been previously sized, are combined in parallel relation and passed between a guide in tangential contact across motor driven rollers. The rollers are partially immersed in the adhesive system coating composition of the present invention and these rollers pick up the coating composition when rotated. The coating which is picked up is brought into contact with the glass fiber strand, coating and impregnating the combined bundle of strand. Relaxation of the tension in the combined bundle of strands opens the spacings between the fibers and between the strands enhancing impregnation of the coating into the bundle. Typically the coating composition solids of the aqueous dip will be about 20-40 percent, depending upon the total amount of coating composition solids to be imparted into the glass fiber cord. Lower solid level will produce cord with low coating add-on based on the weight of the glass and a higher solids content will produce a coated glass fiber cord having a high amount of coating composition solids based on the weight of the glass. Thus, coating add-on weight is about 15 to about 40 percent based on the weight of the glass fibers, more preferably about 20 to about 30 percent to provide a coated glass fiber bundle or cord which is useful for the reinforcement of elastomeric matrices.

After the contacting of the fiber glass bundle with the coating composition of the present invention for a sufficient time to fully impregnate the bundle with the water and solids containing dip, the bundle is passed through a dielectric heater or drying oven. The drying oven is so designed and operated that water is removed rapidly from the inside of the bundle as well as from the surface of the bundle without substantial migration of the solids from the interior to the surface of the bundle and without excessive blistering.

The dried glass bundle is then subjected to heat in order to partially cure the rubber adhesive coating throughout the bundle. It is preferred to partially cure the coating while completing the curing of the coating of the glass fiber, when it is embedded in the rubber matrix being reinforced during the curing of the rubber in the final article.

A second method for making the glass fiber bundles of the invention is based upon the method described in U.S. Pat. No. 3,718,448 entitled "Fiber Forming and Coating Process" by Warren W. Drummond and Donald W. Denniston which is assigned to the present assignee and is incorporated herein by reference and made a part hereof.

As to the rubber to which the coated fiber glass cord will adhere, the invention contemplates any compound of natural rubber stock or any compound of synthetic rubber stock, such as, polymerized isoprene, or polymerized butadiene, or polymerized halogen substituted butadiene, such as, a halogen-2-butadiene-1,3-polymer, for example, chloro-2-butadiene-1,3-polymer and other types.

The invention is further illustrated by the following Examples wherein parts are parts by weight unless otherwise indicated. The Examples should be construed to illustrate the invention and its preferred embodiment but not to limit the invention.

EXAMPLE I

The thermoplastic resorcinol formaldehyde resin of the present invention is prepared by first adding about 70 to 75 percent of the total water at about 22° to 25° C. to a premix tank. Resorcinol in an amount of 57.6 pounds (26 kg.) is added to the water in the premix tank and agitated until completely dissolved. Then 61.2 pounds (27.8 kg) of formaldehyde is added to the premix tank containing the water and resorcinol. The resorcinol and formaldehyde are reacted in the aqueous solution at a temperature of 78°-80° F. (25.6°-26.7° C.) at a pH of 5.0 plus or minus 0.5 for a period of four hours. A solution of potassium hydroxide in water was prepared by adding 1.8 pounds (0.82 kg.) of potassium hydroxide to 24 pounds (10.39 kg.) of water and mixing together until the potassium hydroxide is dissolved. At the end of four hours the aqueous solution of potassium hydroxide was slowly added to the premix tank containing the reacted resorcinol and formaldehyde. After the addition the temperature was maintained at 75°-80° F. (24°-27° C.) at a pH of 7.5 and the reaction was continued for a period of time of 5 hours. The resorcinol formaldehyde resin product contained after 5 hours is the thermoplastic, water soluble, resin of the present invention, having trimer polymers that are slightly cross-linked or uncross-linked trimer polymers and dimer polymers and no higher oligomers than trimer that may or may not be making up the polymer mixture that constitutes the resin, and also having a small amount of unreacted formaldehyde.

EXAMPLE II

Eleven gallons (3.79 L) of deionized water at 110° F. (43.3° C.) was added to a tank and 19.2 pounds (8.71 kg.) of resorcinol was added to the water in the tank and agitated until completely dissolved. To this aqueous mixture resorcinol there was added 20.4 pounds (9.25 kg.) of formaldehyde and the temperature was adjusted to 78°-80° F. (26°-27° C.) at a pH of 5.0 plus or minus 0.5. This temperature was maintained for a period of time of four hours. In the meantime an aqueous solution of potassium hydroxide was prepared by mixing 0.6 pounds (0.27 kg.) potassium hydroxide and 8 pounds (3.63 kg.) of deionized water. At the end of four hours the aqueous solution of potassium hydroxide was added slowly to the resorcinol formaldehyde reaction mixture in the tank. After the addition of the aqueous potassium hydroxide solution the temperature was maintained at 75°-80° F. (24°-27° C.) at a pH of 7.5 for a period of time of 5 hours. After the 5 hours the resorcfnol formaldehyde resin product was the thermoplastic, water soluble, resorcinol formaldehyde resin of the present invention.

EXAMPLE III

Twelve gallons of dionized water at 110° F. (43.3° C.) was added to a tank and 20.8 pounds (9.4 kg.) of resorcinol was added to the water in the tank and agitated until completely dissolved. To this aqueous solution of resorcinol there was added 22.8 pounds (10.3 kg.) of formaldehyde. The formaldehyde and resorcinol aqueous solution was reacted at a temperature of 78°-80° F. (26°-27° C.) at a pH of 5.0 plus or minus 0.5 for a period of time of four hours. Meanwhile an aqueous solution of potassium hydroxide was prepared by dissolving 0.6 pounds (0.27 kg.) of potassium hydroxide in two gallons of deionized water. At the end of four hours the aqueous solution of potassium hydroxide was slowly added to the resorcinol formaldehyde reaction mixture. After the addition of the aqueous potassium hydroxide the temperature of the reaction mixture was maintained at 75°-80° F. (24°-27° C.) and the pH of the reaction was continued for a period of time of five hours after which the resorcinol formaldehyde produce was the termoplastic, water soluble, resorcinol formaldehyde resin of the present invention.

EXAMPLE IV

Production of Adhesive System with Long-Chain, Thermoplastic, Water Soluble Resorcinol Formaldehyde Resin To a main mix tank there was added 1,440 pounds (653 kg.) of polybutadiene latex, Goodyear 6290 and 1,080 pounds (490 kg.) of vinylpyridene and polybutadiene latex, Goodyear 5622. To this mixture of latices there was added 133 gallons (503.5 L) of deionized water and while doing that 21.6 pounds (9.8 kg.) of antioxidant, Bostex 294 was added with deionized water to the mix tank. To a separate mixing tank there was added 46 gallons of deionized water and 10.8 pounds (4.9 kg.) of the antioxidant Paracure A-09. To this mixture there was added 108 pounds (4.9 kg.) of wax, Mobilcer Q and the solution was mixed for ten minutes and then added to the mixture of polybutadiene and vinylpryridine latices in the main mixing tank. After the resorcinol formaldehyde resin produced according to Example I had been aged for 9 hours it was added slowly to the mix tank containing the mixture of polybutadiene and vinylpyridene latices and wax and antioxidant. After the resorcinol formaldehyde resin was added, the mixture was aged for 10 hours. Care must be taken that the resorcinol formaldehyde resin has a pH of 7.5 or above to avoid coagulation of the latices. If the pH of the resin is not 7.5 or above it may be adjusted by the addition of potassium hydroxide to the resin before it is added to the polybutadiene and vinylpyridene latices. Then, a mixture of aqueous ammonium hydroxide is prepared by dissolving 7.2 pounds (3.3 kg.) of ammonium hydroxide in 9 gallons (34 L) of deionized water and after the resin latex mixture has been aged the aqueous ammonium hydroxide is added to the resin latex mixture in the main tank. The mixture is then agitated for a period of time to produce the adhesive system coating composition having a percent solid of 27 plus or minus 0.5, a pH of a 8.5 plus or minus 0.3, and a dip life of 50 hours. This adhesive system coating composition can be used to bind glass fibers to rubber matrices.

EXAMPLE V

Preparation of Adhesive System Coating Composition Using Long-Chain, Thermoplastic, Water Soluble Resorcinol Formaldehyde Resin To a mixing tank there was added 532 pounds (14.5 kg.) of polybutadiene latex, Goodyear 2374, and 400 pounds (181.4 kg) of a styrenebutadiene-vinylpyridine latex, Goodyear 5622. In addition there was added 48 gallons (132 L) deionized water along with 8 pounds (3.6 kg.) of antioxidant, Bostex 294. In a separate tank 10 gallons (37.9 L) of deionized water was added along with 4 pounds (1.8 kg.) of antioxidant Paracure A-09 and 40 pounds (18 kg.) of a wax Mobilcer Q which was mixed for 10 minutes and then added to the main mixing tank containing the mixture of latices. After the long-chain, thermoplastic, water soluble resorcinol formaldehyde produced in Example III has been aged for 9 hours, it was slowly added to the main mixing tank that contained a mixture of latices and antioxidant and wax. After the resorcinol formaldehyde resin was added the mixture was aged for 10 hours. An aqueous solution of ammonium hydroxide was prepared by adding 2.4 pounds (0.18 kg.) of ammonium hydroxide to 4 gallons (15 L) of deionized water. This aqueous ammonium hydroxide solution was added very slowly to the resin latex mixture and was stirred for about 10 minutes. An aqueous resorcinol solution was then prepared by adding four pounds (1.8 kg.) of resorcinol to 4 gallons (15 L) of deionized water which was mixed together until the resorcinol was completely dissolved. The aqueous resorcinol solution was then added very slowly within about 15 minutes to the main mix tank containing a resin latex mixture. The mixture was then stirred for 25 minutes and then automatically agitated for one minute every half hour to produce an adhesive system coating composition having a percent solids of 27 plus or minus 0.5, a pH of 8.5 plus or minus 0.3, and a dip life of 50 hours. The resorcinol solution was added to the resin latex composition to improve the bonding characteristics of the adhesive system. The added resorcinol increases the adhesion level of the adhesion system by increasing the resin content and increase the plurality of the dip for better wettability and impregnation.

EXAMPLE VI

The Preparation of a Long-Chain, Thermoplastic, Water Soluble Resorcinol Formaldehyde Resin and Adhesive System.

To a pre-mixed tank there was added 24 gallons (91 L) of deionized water at 110° F. (43.4° C.). To the water in the reaction vessel, there was added 96 pounds (43.5 kg.) of resorcinol which was agitated until completely dissolved. To the aqueous solution of resorcinol there was added 56.8 pounds (25.8 kg.) of formaldehyde. The resorcinol and formaldehyde were reacted in the aqueous solution at a temperature of 78°-80° F. (26°-27° C.) at a pH of 5.0 plus or minus 0.5 for a period of time of 4 hours. An aqueous potassium hydroxide solution was prepared by dissolving 1.6 pounds (0.73 kg.) of potassium hydrxide in 40 pounds (18 kg.) of deionized water. At the end of fours hours reaction time of the resorcinol and formaldehyde under acidic conditions the aqueous solution of potassium hydroxide was added slowly to the reaction mixture. After the addition the pH was around 7.5 and the reaction was continued at a temperature of 78°-80° F. (26°-27° C.) for a period of 5 hours. At the end of this time the resorcinol formaldehyde resin produced was the, thermoplastic, water soluble resorcinol formaldehyde resin of the present invention.

In a main mix tank there was added 912 pounds (414 kg.) of a styrene-butadiene-latex Firestone SR6642, and 400 pounds (181.4 kg.) of a carboxy polybutadiene latex, GenFlow 8020 and 720 pounds of a polybutadiene styrene latex, Firestone S-272. To this main mix tank there was also added 140 gallons (530 L) of deionized water along with 16 pounds (7.26 kg.) of antioxidant, Bostex 294. Then in a separate mix tank there was added 20 gallons (75.7 L) of deionized water and 8 pounds of an an antioxidant Paracure A-09 along with 80 pounds (36.3 kg.) of wax, Mobilicer Q, which was mixed for 10 minutes, and then added to the main mix tank containing the mixture of latices. After the long-chain, thermoplastic, water soluble, resorcinol formaldehyde resin produced above has aged for 9 hours it was slowly added to the main mixing tank containing the mixture of latices. After the resin was added the mixture was aged for 6 hours and 280 pounds (127 kg.) of Neoprene latex, Neoprene 735-A was added slowly to the mixture. An aqueous solution of ammonium hydroxide was prepared by dissolving 4.8 (2.2 kg.) pounds of ammonium hydroxide and 6 gallons (23 L) of deionized water. This aqueous solution of ammonium hydroxide was added to the resin latex mixture after the mixture had aged for about 30 minutes after the addition of Neoprene. The addition was accomplished very slowly and after the addition the mixture was aged for 15 minutes, and after 1 hour was placed on an agitator for automatic agitation of one minute each half hour to produce an adhesive system coating composition having a solids content of 28.0 plus or minus 0.5, a pH of 8.5 plus or minus 0.3, a dip life of 60 hours.

EXAMPLE VII

Coating Glass Fibers With Adhesive Systems Coating Composition Containing Long-chain, Thermoplastic, Water Soluble, Resorcinol Formaldehyde Resin.

Glass fibers that were formed at a fiber-forming bushing, sized with an aqueous sizing composition gathered into strand and wound onto a forming package that is then dryed and mounted on a creel are unwound and coated with the adhesive system coating composition of the present invention. Fiber glass strands such as G-75,5/0 or G-75/10/0 or G-75,15/0, which characteristically are $9.6 \times 10^{-6}$ meters to $9.1 \times 10^{-6}$ meters in diameter and have a filament count of 2,000 in a cord being constructed of 5 strands each strand having 400 filaments, are coated by the adhesive system coating composition of the present invention. Also, K fibers, such as, K-15 strand typically having 1,000 filaments therein each filament having a diameter of about 13.34 plus or minus 0.63 microns (5.25 plus or minus $0.25 \times 10^{-4}$ inches) wherein 1 to 3 strands per cord are used, can also be coated by the adhesive system coating composition of the present invention. When G cord is to be used in bias belted tires the cord should be constructed to 5 strands and when the cord is to be used in radial tires, there should be 10 to 15 strands per cord.

The 10 to 15 strand cord allows higher packing of the cord per unit area, thereby providing greater strength to the tire carcass. This strength is necessary to obtain the desirable properties in radial ply tires. G fibers were sized with a chemical size containing predominantly polypropylene emulsion containing 25 percent by weight of polypropylene and 6 percent by weight of emulsifying agent and also containing smaller amounts of polyvinyl alcohol, and amide imidazolene, and methylacryloxypropyltrimethoxysilane. This sizing composition was applied to the fibers during formation and the strand formed therefrom was dried and/or cured in accordance with the method described in U.S. Pat. No. 3,655,353 herein incorporated by reference.

Adhesive system coating composition prepared in Example IV and Example V were used to coat the glass fiber cord. The glass fiber cord was prepared by coating 15 of the sized strands with the coating composition from Example IV and Example V. This cord was incorporated into a rubber stock and also used to reinforce the belts of pneumatic tires.

The tire cord properties of these coated fiber glass cords were tested for the adhesion level of the adhesive system in various rubber stocks. The results of these tests are presented below. The successful bonding of rubber to tire cord is measured by several tests one of these is strip adhesion. Strip adhesion for rubber coated glass cord is determined by the following method. A cylindrical drum is wrapped by a $10.2 \times 26.7$ centimeter $\times 0.1$ centimeters strip of rubber stock. The rubber stock occupied substantially all of the surface area of the cylindrical drum. The coated glass fiber year is wrapped about the rubber stock on the drum in a cylindrical fashion, providing a continuous layer of yarn over the rubber stock. The wound rubber stock has been moved from the cylinder and cut into a $7.6 \times 25.4$ centimeter sample. A strip of the $7.6 \times 25.4$ centimeter rubber is placed in a $7.6 \times 25.4$ centimeter mold and the above rubber strip with the coated strand thereon is placed in the mold with the strand side away from the first rubber strip. A number of $27.62 \times 2.54$ centimeter strips of Holland cloth are placed at opposite ends of the strand side of the rubber strip. Another $7.62 \times 25.4$ centimeter rubber strip is placed over the Holland cloth and lastly, a $7.62 \times 25.4$ centimeter rubber strip of coated strand thereon is placed on the last mentioned rubber strip with the strand side in contact with the last mentioned rubber strip. The mold is closed and the rubber cord laminate is cured at 4,780 pascals for 30 minutes at 149° C. The rubber cold laminate is removed from the mold and is allowed to simply cool overnight.

The laminate is cut into $14 \times 2.54$ centimeter strips and heated for 30 minutes at 121° C. after which the Holland cloth is removed from the laminate. After setting an Instron ® test device for a gauge length of 1.27 to 1.9 centimeter and calibracting the unit for a cross head speed of 5.1 centimeter per minute, the bottom layer of the heated rubber and the exposed cord are placed in the top jaw, and the top layer of the heated rubber is placed in the bottom jaw of the test device. The Instron ® test device is operated until a separation of 5.1 centimeter is obtained and the loading is noted. The top layer is inserted into the top jaw and the cord in the bottom jaw with a gauge length of 1.27 to 1.9 centimeters. The Instron ® device is operated until a separation of 5.1 is obtained and the loading is noted. The test is repeated for the opposite end of the specimen and for additional specimens included in the example. The results of the test are averaged for adhesion of the cord to rubber.

The "In-rubber tensile" is determined by curing the cord in a rubber matrix and testing the glass fiber cord reinforced matrix in an Instron device with a gauge of 17.8–19 centimeter and a cross head speed of 5.1 centimeter per minute. The jaws are separated and the force required to break the sample is recorded.

The results of the foregoing described test procedures are presented in Table I.

TABLE I

| | Strip Adhesion in Various Rubber Stocks | | | |
|---|---|---|---|---|
| Cord | Stock A[1] lb/Rating* | Stock B[2] lb/Rating | Stock C[3] lb/Rating | In-Rubber-Tensile lb. |
| Coating Composition of Example IV | 21/1.3 | 47/4.5 | 34/4.8 | 200 |
| Coated with Composition of Example V | 41/4.7 | 45/5.0 | 44/5.0 | 210 |
| Coated with Composition Similar to Example V wherein the Goodyear Latices are replaced by Firestone Latices (SR 6642 and | 36/4.8 | 49/5.0 | 47/5.0 | 229 |

TABLE I-continued

Strip Adhesion in Various Rubber Stocks

| Cord | Stock A[1] lb/Rating* | Stock B[2] lb/Rating | Stock C[3] lb/Rating | In-Rubber-Tensile lb. |
|---|---|---|---|---|
| SR 272) | | | | |

*Rating: 1-5: 1 is adhesive failure, and 5 is cohesive failure
[1] Rubber Stock available from McCreary Tire & Rubber Co.
[2] Rubber Stock available from B. F. Goodrich Co.
[3] Rubber Stock available from Firestone Tire & Rubber Co.

Tests were also performed on the fiber glass cord coated with the adhesive systems coating composition of the present invention, when the cord was bound to rubber and used in pneumatic tires. One such test is the Gristmill test which measures the compression fatigue resistance of the cord. A major part of the stress is applied to the outside shoulder of the tire where cord breakage is most likely to occur. Cord breaks in each tire belt are totaled and for uniformity, adjusted to breaks/meter of belt length.

The ambient gristmill test involves the following:
a. inflate tires to 24 psi at 75° F.,
b. mount one tire on the right front position of a standard vehicle which has been pre-loaded to 100 percent T and RA load at 24 psi. Record tire pressure at this point and do not make any adjustments,
c. Drive the vehicle at 15 miles per hour for 800 laps in counter-clockwise direction. Record temperature and pressure of tire at the end of the test.
d. x-ray the tested tire inflated to determine a condition of the cord.

The cold gristmill test involves:
a. inflate tires at 24 psi (1.69 kg/km$^2$) at 70° F. (21° C.),
b. tires are cooled for 4 hours to −40° F. (−40° C.) then one tire is removed from the cold box and placed on the right front position of the car. It is allowed to warm up to −25° F. (−32° C.) before starting the test. Record tire pressure at this point and do not make any adjustment,
c. drive the car at 15 mph (8.05 km/rh) for ten laps in counterclockwise direction. This constitutes one cold cycle. Record temperature and pressure of the tire at this point. Put tire back in the cold box for 4 hours at −40° C.
d. Put the tire back in the cold box for four hours at −40° C.
e. Repeat steps b, c, and d for the specified number of cycles.
f. x-ray the tested tire inflated to determine the cord breakage if any. The test conditions for both ambient and cold include an 85 foot (24.4 meters) diameters circle wherein 100 laps at 15 miles per hour in a clockwise direction are made at 100 laps at 15 miles per hour in (8.05 km/hr) counter-clockwise direction are made. The tires are inflated 24 psi (1.69 kg/cm$^2$). The load is a T&RA rated load for 24 psi (1.69 kg/cm$^2$) and the fixed position mounting is the front mounting.

Table II presents the results of Gristmill Testing on the glass fiber yarm embedded in rubber stock with the use of the adhesive system of Examples IV, V, and VI, and a commercial glass radial tire cord.

TABLE II

Radial Tire Cord Performance Gristmill Test

| Cord Coated With: | Ambient Gristmill Test 1600 laps: Breaks/Meter* | Cold Gristmill Test 7 cycles: Breaks/Meter |
|---|---|---|
| Example IV Adhesive System | 3 | 0 |
| Example V Adhesive System | 5 | 3 |
| Example VI Adhesive System | 15 | 100 |
| Commercial Cord | 10 | 4 |

*B/M is the average number of break per one meter of tire belt.

In Table III Indoor Cold Wheel Test: 5° Slip angle involves cooling the tire to a −20° F. (−290° C.) mounting tire on a loaded wheel and running for one hour. This is one cycle. This step is then repeated to a total of 4 cycles. The tire is stripped and the belts are rated. A rating of 7 is no cord failure and a rating of 1 is excessive cord breakage.

TABLE III

Radial Tire Cord Performance Indoor Cold Wheel Test: 5° Slip Angle

| Cord Coated With: | No. of Cycles | Belt Rating* Top Belt | Belt Rating* Bottom Belt |
|---|---|---|---|
| Example IV Adhesive System | 4 | 4.5 | 6.8 |
| Example V Adhesive System | 4 | 5.5 | 6.9 |
| Commercial Cord | 4 | 5.5 | 6.5 |

*Belt Rating: 1 to 7:1 is sever cord breakage and 7 is zero cord breakage.

The foregoing has described the composition of a thermoplastic, water soluble phenolic aldehyde resin particularly a resorcinol resin which has improved flexibility along with toughness and the process for producing same. The foregoing has also described the use of the improved flexible tough phenolic aldehyde resin in an adhesive system coating composition, wherein the resin is combined with a latex or latices along with other conventional additives to produce a dip for fibrous material particularly glass fiber strand. The foregoing has also described the filamentary cord like glass fiber cord produced with the use of the improved flexible and tough phenolic aldehyde resin present in an adhesive system coating composition and the benefit of improved flexibility and improved resistance to compression fatigue of the glass fiber cord coated with the adhesive system coating compositon containing the improved flexible and tough phenolic resin.

I claim:

1. An improved flexible and tough resorcinolic or resorcinolic and phenolic aldehyde resin, comprising a thermoplastic, water soluble, resorcinol or resorcinol and a phenolic aldehyde resin that is a mixture of polymers having trimer polymer and dimer polymer and no higher non-water soluble oligomers produced by:

a. reacting to less than 100 percent completion a resorcinol or resorcinol and phenolic compound with an aldehyde in an amount of aldehyde to resorcinol or aldehyde to mixture of resorcinol and phenolic compound in mole ratio in the range of about 0.8 to about 1.5 and at a pH in the range of about 3.5 to about 5.5 to limit formation of resorcinol and phenolic alcohols and for a period of time equivalent to a period of time in the range of about 3 hours to about 10 hours at a temperature in the range of about 55° F. (13° C.) to about 90° F. (32° C.) to produce a resinous polymer mixture along with unreacted resorcinol, or resorcinol and phenolic compound and aldehyde in the polymer mixture, and b. continuing the resin reaction at a pH maintained above 7 to about 7.5 at a temperature in the range of 55° F. (13° C.) to 90° F. (32° C.) when the residence time is in the range of 0.5 hours to about 10 hours thereby producing a thermoplastic, water soluble, resorcinolic or resorcinolic and phenolic aldehyde resin mixture with improved flexibility and with toughness, since it has a substantial amount of trimer and dimer polymers without any higher oligomers and has only slight cross-linking and is capable of further reaction.

2. Composition according to claim 1 wherein the phenolic compound is a mixture of resorcinol and phenol.

3. Composition according to claim 1 wherein the aldehyde is formaldehyde.

4. Composition according to claim 3 wherein the formaldehyde is in the form of formalin.

5. Composition of claim 4 wherein the slightly cross-linked, thermoplastic water soluble resorcinolic or resorcinolic and phenolic aldehyde resin mixture has up to 20 percent unreacted aldehyde.

6. Composition of claim 1 wherein an acid catalyst was used to obtain a pH of about 3.5 to about 5.5.

* * * * *